Feb. 19, 1957  E. B. HAMMOND, JR  2,782,395
AIRCRAFT NAVIGATION INSTRUMENT
Filed June 11, 1954  3 Sheets-Sheet 2
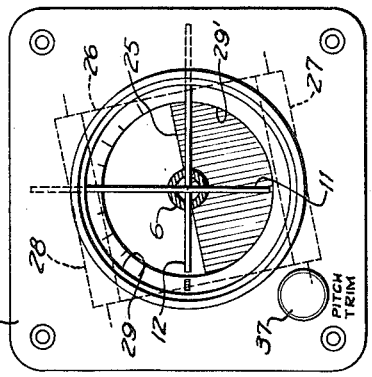
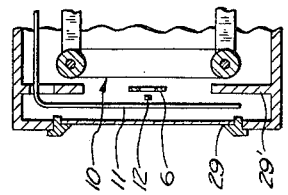
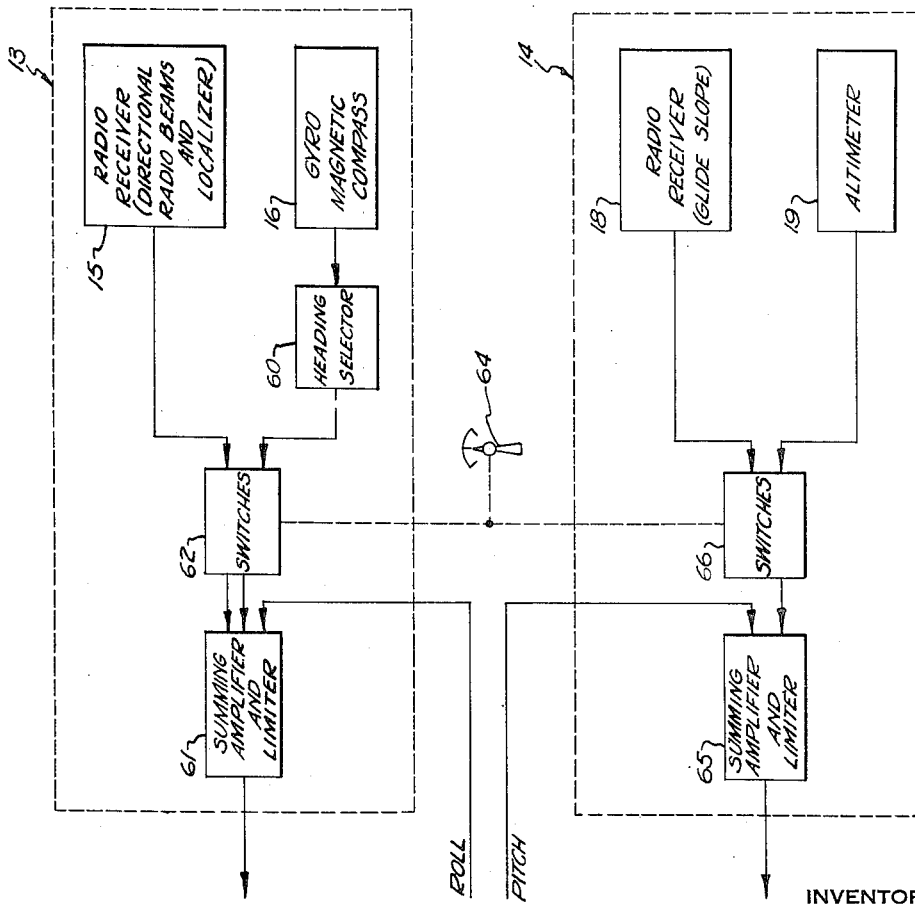
INVENTOR
EDMUND B. HAMMOND, JR.
BY
ATTORNEY

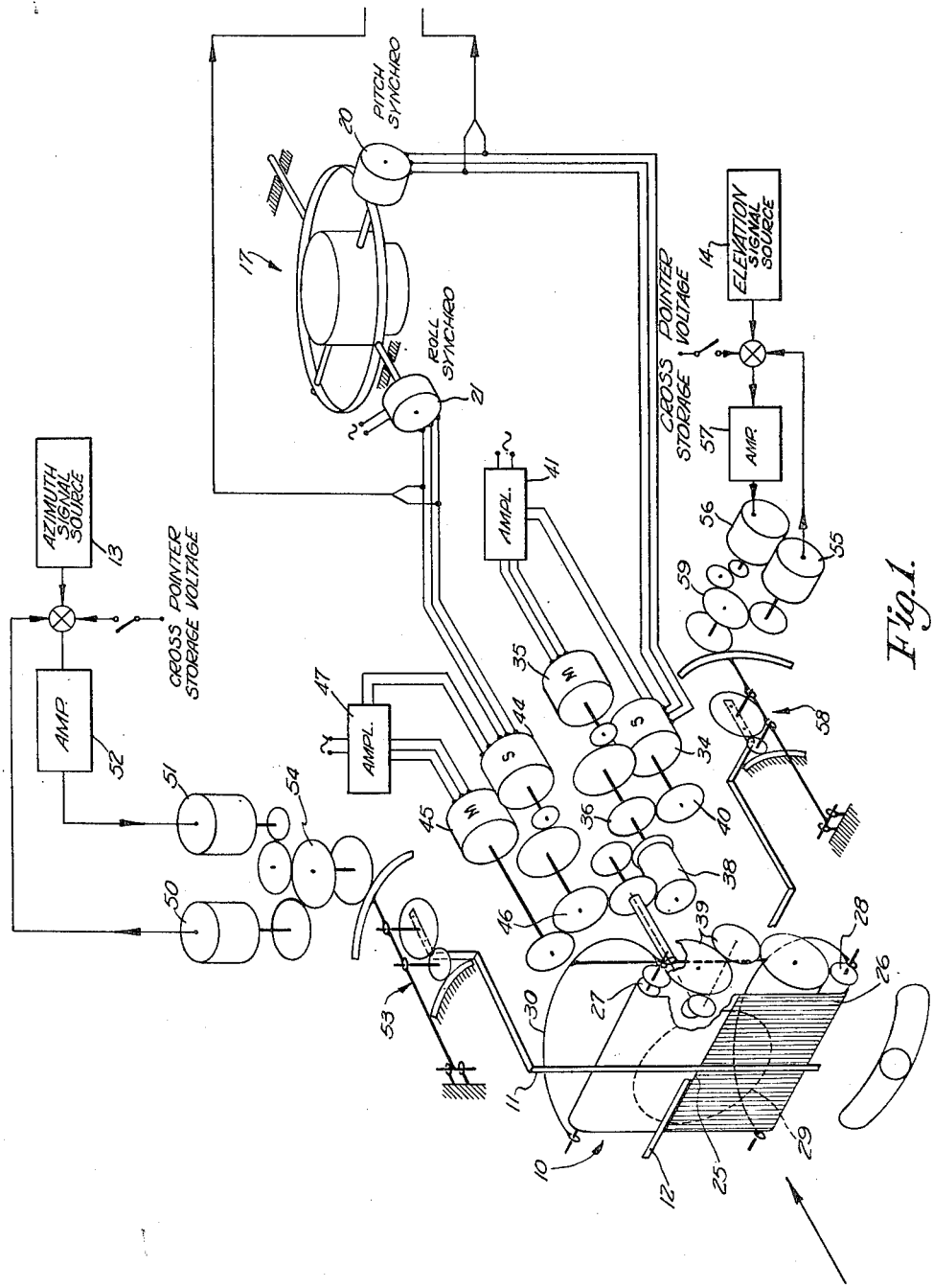

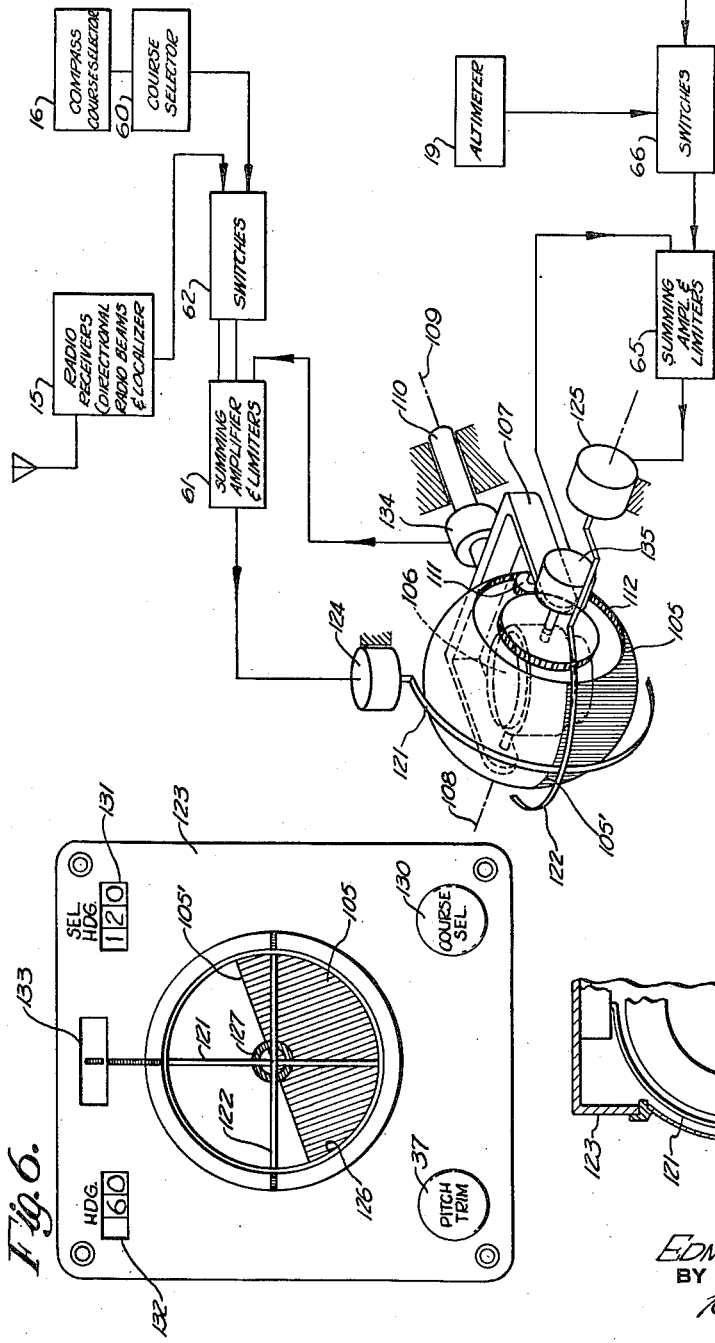

United States Patent Office 2,782,395
Patented Feb. 19, 1957

2,782,395

AIRCRAFT NAVIGATION INSTRUMENT

Edmund B. Hammond, Jr., Merrick, N. Y., assignor to Sperry Rand Corporation, a corporation of Delaware Application June 11, 1954, Serial No. 436,169

11 Claims. (Cl. 340—27)

This invention relates generally to aircraft navigation instrumentation and is a continuation-in-part of my copending application Serial No. 244,761, for Missile Guidance System, filed September 1, 1951, and assigned to the same assignee as the present invention.

More particularly, the present invention relates to a navigational aid for manually piloted aircraft wherein the pilot is relieved of the need of scanning and simultaneously interpreting the information supplied by a number of independent or separately mounted flight instruments. With the instrument of the present invention the pilot is also relieved of the task of anticipating the amount of control demanded by such interpretation and is yet provided with an indication of the information normally supplied by these independent instruments and of the actual amount of craft control applied by the pilot. The present invention relates to a navigational aid for manually piloted aircraft which is an improvement over the instrument set forth in U. S. Patent No. 2,613,352, issued to S. Kellogg, 2nd, on October 7, 1952, for a Radio Navigation System, which patent is assigned to the same assignee as the present application.

The instrument of the present invention not only supplies information which is the result of a combination of attitude, heading and radio information which is combined and correlated to provide a displacement of a minimum number of indicating elements such as, for example, a cross pointer meter, but further supplies additional information regarding the actual attitude of the craft when piloted in accordance with the commands of the cross pointers. As set forth in the above Kellogg patent, the cross pointer bars or guidance indicators when symmetrically disposed one with the other relative to a reference index representing the aircraft, the pilot is advised that his craft is flying correctly in accordance with a selected flight plan, although perhaps not on a given or selected flight course. As further stated in the above-mentioned patent, such a plan may call for the use of this indicating system as a flight instrument for "dead-reckoning" flights, or as a radio navigation instrument utilizing radio range system signals, or for making approaches on an instrument landing system (I. L. S.) to an airport under adverse weather conditions. Once a specific flight plan has been selected or chosen, through suitable selector switches, the pilot causes the aircraft to approach and thereafter follow this flight plan by making the indicated attitude changes dictated by the instantaneous deflections of the bars of the cross-pointer indicator. Therefore, to achieve the object of any selected flight plan, it is only necessary for the pilot to follow the dictates of the cross pointer or guidance indicator, interpretation and correlation of the indications of other flight instruments not being necessary.

However, it has been found that although perfectly coordinated flight maneuvers in seeking a selected flight path are achievable by constantly maintaining the guidance pointers symmetrically disposed in the face of the instrument, it has been further found desirable to display on the same instrument information representative of the attitude of the craft relative to the horizon which, as set forth in the said Kellogg Patent No. 2,613,352, is the control parameter of the system. With the indicator of the present invention, the information regarding the craft's attitude is displayed relative to the same index against which the guidance indicator is read.

It is, therefore, a primary object of the present invention to provide an improved navigational instrument for enabling a pilot to fly an aircraft on which the instrument is mounted in accordance with a selected flight plan.

It is another object of the present invention to provide a navigational instrument which displays to the pilot not only information which will enable the pilot of the craft to follow a preselected flight plan merely by controlling the attitude of the aircraft in accordance with the indications presented to him by a guidance indicator, the craft being guided, thus to approach and maintain the selected flight plan, but also to supply the pilot information regarding the actual attitude of the craft so controlled, this information being displayed with reference to the same reference index against which the guidance indicators are read.

Another object of the present invention resides in the provision of a navigational instrument which displays to the pilot information as to whether to fly the craft to the right or left and upwardly or downwardly in accordance with the displacement of a pair of azimuth and elevation pointers which are controlled, at least in part, by the roll and pitch attitude of the craft, but also to supply the pilot information as to the magnitude and direction of the craft control in roll and pitch applied by the pilot in responding to the movement of the azimuth elevation pointers.

Generally, the instrument of the present invention comprises an instrument housing having a preferably circular viewing opening in the front wall thereof through which the various movable elements of an instrument may be observed. A guidance indicator is provided which includes a horizontal bar or pointer and a similar vertical bar or pointer movable vertically or horizontally, respectively, across the opening to thereby indicate to the pilot whether to fly the craft upwardly and downwardly and to the right or left. The bars or pointers are displaced in accordance with the outputs of a computer which combine and correlate information regarding the attitude, heading, and radio information in a manner set forth in the above-noted Kellogg patent. As disclosed therein, the pilot flies his craft in accordance with the instantaneous deflections of these guidance indicator bars, and by maintaining them in a symmetrical relation, e. g., zeroed on a reference index, through proper control of the attitude of the craft, the craft will be guided so as to approach and maintain the selected flight path.

Situated directly behind the guidance indicator and also viewable through an opening in the front wall of the instrument is a background for said guidance indicator which includes a movable member having a horizon-simulating surface disposed adjacent, and in slightly spaced relation to the front wall, of such dimensions that it extends radially outwardly in all directions beyond the edge of the circular opening. This background member is supported to rotate substantially about the center of said opening as an axis and to move in directions substantially radially of said opening. The background member is further provided with a horizon-defining line substantially sub-dividing the surface thereof into upper and lower, that is, sky and ground areas, the area above the line being preferably of a light color and the area below the line being of a contrasting or darker color. The background member is stabilized relative to the roll and pitch attitude of the craft on which the instrument is mounted by means of a vertical gyroscope operatively connected therewith. Furthermore, the background member may be provided with a series of relatively vertically disposed marks such as, for example, short horizontal lines and dots spaced one above the other, which, when viewed as a whole, define a vertical roll-attitude-indicating line.

Thus, in flying the aircraft in accordance with the dictates of the guidance indicators, the pilot will be informed as to the magnitude and direction of craft control in roll and pitch applied by him in responding to the guidance indicator.

Other objects of the present invention not at this time particularly enumerated will become clearly apparent from the following detailed description of the exemplary embodiments of this invention when considered in connection with the accompanying drawings, wherein:

Fig. 1 is a perspective schematic view of one embodiment of the instrument of the present invention;

Fig. 2 is a block diagram illustrating the source of control signals used for operating the indicating elements of the instrument illustrated in Fig. 1;

Fig. 3 is a front elevation view of the face of the instrument illustrated in Fig. 1;

Fig. 4 is a schematic fragmentary sectional view of the front portion of the instrument illustrated in Fig. 1;

Fig. 5 is a perspective schematic of another embodiment of the instrument of the present invention;

Fig. 6 is a front elevation view of the face of the instrument illustrated schematically in Fig. 4; and Fig. 7 is a schematic fragmentary sectional view of the front portion of the instrument illustrated in Fig. 5.

Referring now to Figs. 1, 2, 3 and 4 wherein there is illustrated a preferred embodiment of the instrument of the present invention, reference character 5 designates the instrument housing in which the apparatus illustrated in Fig. 1 is mounted and which is adapted to be secured to the instrument panel of the aircraft in a conventional manner. Preferably centrally located in the front wall of the instrument there is provided a circular viewing opening or aperture 29 through which the movable elements of the indicator may be viewed.

It will be understood that the term "front wall" as used in this specification may designate not only an exterior instrument wall but may also designate an interior wall or partition, such as, for example, the mask 29' shown in Fig. 4. In either case the guidance pointers move across the opening either in front thereof as illustrated in Fig. 4 or in back of the opening as illustrated in Fig. 6 and the horizon-simulating member is positioned behind the guidance pointers and forms a background therefor. A craft reference 6 is provided preferably at the center of opening 29' against which the movable elements of the indicator may be simultaneously read.

The azimuth guidance indicator, elevation guidance indicator, and pitch and roll attitude indicator elements of the instrument illustrated in Figs. 1, 2 and 3 are each driven through respective positional servo loops consisting of a synchro and motor combination receiving power from corresponding servo amplifiers. These servo loops function to position the artificial horizon indicator 10 in pitch and roll and to position the cross pointers or guidance indicators 11, 12 in azimuth and elevation, respectively, relative to the common craft reference index 6. The azimuth and elevation guidance indicator control signals originate in azimuth and elevation signal sources 13, 14, respectively; the azimuth control signal being computed from selected radio information from suitable radio receiver 15, heading information from a directional reference and course selector 16, and roll attitude information from vertical gyro 17; and the elevation control signal being computed from selected radio information from receiver 18 or altitude information from altimeter 19, and pitch attitude information from vertical gyro 17. The pitch and roll signals for artificial horizon 10 originate in pitch and roll synchros 20, 21, respectively, located in the vertical gyro 17 (see Fig. 2).

As set forth in the above-identified parent application Serial No. 244,761, the artificial horizon indicator 10 presents visual pitch and roll data to the pilot. The horizon is simulated by the horizontal boundary 25 of two contrasting colors on a curtain or shade 26 comprising a broad, flat, belt-like member made of a flexible material such as, for example, nylon fabric or the like, which is suspended between or reeved on geared rollers 27, 28 and viewable through circular aperture 29. The extent and direction of airplane pitch is indicated by vertical positioning of the curtain 26 over the rollers 27, 28; the extent and direction of airplane roll is indicated by rotation about the roll axis of the frame 30 on which the curtain 26 is suspended. The construction of the pitch and roll indicator is described in detail in copending application Serial No. 271,681, filed February 15, 1952, in the name of J. R. Ericson, and assigned to the same assignee as the present application.

The pitch indicator system includes a synchro 34, a pitch control motor 35, and a gear train 36 which positions the horizon curtain 26 in pitch. An angle of attack or pitch trim control 37 of conventional design may be provided and is adjusted at the discretion of the pilot. The pitch motor 35 drives the rollers 27, 28 and hence horizon curtain 26 in accordance with signals from gyro vertical pitch synchro 20 proportional to sin $\theta_p$ in a vertical direction through a differential 38 and gear train 39 from motor to curtain. The differential is provided for preventing the introduction of roll motion from causing a consequent pitch motion not derived in the pitch system. Synchro 34 is meshed through a gear train 40 to the pitch motor 34 and pitch indicator amplifier 41 supplies an amplified pitch error signal to pitch control motor 35.

Similarly, the roll indication system includes a synchro 44, roll control motor 45, gear train 46, and the curtain suspension frame 30. The roll motor 45 receives a control voltage from the roll indicator amplifier 47 which receives roll error signals from the gyro vertical roll synchro 21, and, through gear train 46, rotates the curtain frame 30.

The azimuth cross-pointer or azimuth guidance indicator system contains a synchro 50, control motor 51 and amplifier 52, an epicyclic gear train 53, and a vertical pointer 11. The azimuth control motor 51 receives control voltages from the azimuth indicator servo amplifier 52 which amplifies the guidance error signal from the azimuth signal source 13. The motor 51 drives a gear train 54 which leads into the epicyclic gear arrangement 53. This epicyclic unit transforms rotation of the motor shaft into horizontal translation of a vertical pointer 11 across viewing opening 29 parallel to the face of the indicator panel or front wall 5. The azimuth synchro 50 meshes with the epicyclic gear train and is therefore positioned by the motor 51. When it is desired not to use the vertical cross-pointer or guidance indicator, the control motor 51 receives a dummy signal (cross pointer stowage signal) which drives the azimuth cross pointer to a stowed position out of view of the pilot.

The elevation cross pointer system is substantially identical to the azimuth cross pointer system but moving horizontal or elevation guidance pointer 12 parallel to the face of the instrument in a vertical direction. Thus, the elevation control motor 56 receives control voltages from the elevation indicator servoamplifier 57 which amplifies the guidance error signal from elevation signal source 14. The motor 56 drives gear train 59 which leads into the epicyclic gear arrangement 58. As above, epicyclic unit 58 transforms rotation of the motor shaft into vertical translation of horizontal pointer 12 across viewing opening 29 parallel to the face of the indicator panel or front wall 5. Elevation synchro 55 meshes with epicyclic gear train and, therefore, is positioned by the motor 56. When it is desired not to use the elevation cross pointer or guidance indicator 12, control motor 56 receives a dummy signal (cross pointer stowage signal) which drives the elevation cross pointer to a stowed position out of view of the pilot. With the guidance indicator pointers 11, 12 stowed, the instrument may be used as an artificial horizon alone.

As indicated in Fig. 3, the broad, flat, belt 26 forms a background for the guidance pointers 11 and 12 and is of a dimension such that it extends outwardly in all directions beyond the periphery of the viewing opening 29.

In the instrument set forth in the above-identified parent application Serial No. 244,761 the azimuth and elevation guidance pointers 11 and 12 are positioned in accordance with the output from azimuth and elevation guidance signal sources which in the present application are illustrated at 13 and 14, respectively. In a preferred embodiment of the present invention, these sources comprise the apparatus schematically illustrated in Fig. 2. As shown, the azimuth signal source comprises a radio receiver 15 which supplies a signal proportional to the displacement of the aircraft on which the instrument of the present invention is mounted from a selected radio course as defined by a directional radio beam such as, for example, a V. H. F. radio range or the localizer beam of an instrument landing system. A directional reference 16 which may comprise a gyromagnetic compass, for example, supplies a signal proportional to the heading of said aircraft relative to the magnetic meridian. A signal proportional to the difference between the heading of the aircraft and the bearing of the radio beam is supplied by a heading selector 60 electrically coupled with compass 16 in a manner set forth in the above-identified Kellogg patent. As shown therein, the heading selector includes a synchro type signal generator, the null of which is adjusted to correspond to the bearing of the radio beam and provides an output signal having a polarity and amplitude respectively proportional to the direction and magnitude of the departure of the heading of the aircraft from the bearing of the radio beam. The radio displacement signal and the difference signal between the heading of the craft and the bearing of the radio beam are supplied to an amplifier and limiter 61 through suitable switches 62 where they are limited and combined with a signal proportional to the bank attitude of the craft as derived from bank or roll synchro 21 on vertical gyro 17 (Fig. 1). Switches 62 are positioned by means of a selector knob 64 which is set by the pilot in accordance with the flight plan he desires to pursue.

Similarly, the elevation signal source 14 ilustrated in Fig. 2 comprises a radio receiver 18 for supplying a signal proportional to the displacement of the aircraft from a directional radio beam, defining, for example, the glide slope of and I. L. S. system. Also, an altimeter 19 is provided for supplying a signal proportional to deviations in the altitude of the aircraft from a predetermined set altitude. Either of these latter signals may be supplied to summing amplifier and limiter 65, through switches 66, where it is limited and combined with a signal proportional to the pitch attitude of the craft as received from pitch synchro 20 on the pitch axis of the vertical gyro 17 (Fig. 1). The outputs of summing amplifiers and limiters 61 and 65 are supplied, respectively, as inputs to the motor control amplifiers 52 and 57 of Fig. 1 for operating the azimuth and elevation guidance indicators 11 and 12.

The selector 64 controlling switches 62 and 66 may be of the same type as that illustrated in the above-identified Kellogg patent and enables the pilot to select the particular flight plan he desires to pursue by establishing circuits within switches 62 and 66 which supply selected signals in their proper polarity senses as inputs to summing amplifiers and limiters 61 and 65, and a change of flight plan can be introduced at any time by manipulation of the switch.

The operation of the azimuth and elevation guidance indicators 11 and 12 in response to the signals received from the azimuth signal sources 13 and 14 is identical to that described in the above-identified Kellogg patent and a detailed description thereof is deemed not necessary in the present application except to set forth that, with selector switch 64 in a position such as to enable the pilot to approach and maintain a selected radio beam, for example, the radio beam displacement signal, the signal proportional to the difference between the actual heading of the craft relative to the bearing of the radio beam as set by heading selector 60, and the roll or bank attitude signal are algebraically combined in such a manner that the azimuth pointer 11 will remain on reference index 6 not only when the craft is on the radio beam but also when the craft is off the radio beam but in an attitude which will return the craft to the beam in an asymptotic manner. In other words, the vertical guidance pointer 11 is controlled not only in accordance with radio displacement signals, but also in accordance with craft attitude signals, and in particular a roll attitude signal, the latter signal being the control parameter of the system in azimuth whereby by controlling the roll attitude of the craft in accordance with the instantaneous deflections of the vertical or azimuth guidance pointer, the pilot will cause the craft to fly to the right or left, as the case may be, to approach and thereafter follow the selected flight path in azimuth. Likewise, and as more fully set forth in the above-identified Kellogg patent, the elevation guidance indicator 12 will be centered on the reference index 6 not only when the craft is on a glide slope radio beam of an I. L. S. system or at the desired selected altitude, as the case may be, but also when the craft is off the glide slope beam or altitude but in a pitch attitude which will return the craft asymptotically to the glide slope beam or to the selected altitude. Again, the pitch attitude of the craft is the controlling parameter of the system in elevation whereby by controlling the pitch attitude of the craft in accordance with the instantaneous deflections of the horizontal or elevation guidance pointers, the pilot will cause the craft to fly up or down, as the case may be, to approach and thereafter maintain the selected flight path in elevation.

However, with the instrument of the present invention the magnitude and direction of the roll and pitch attitude of the craft so controlled by the pilot in responding to the movement of the azimuth and elevation guidance pointers is indicated to the pilot by corresponding movement of the horizon line 25 on the movable curtain or shade 26 which forms the horizon-simulating background for the guidance pointers 11 and 12. It should be noted, however, that in the case where a single synchro provides a roll or bank attitude signal to position the background members 10 in roll as well as to provide the bank angle signal to summing amplifier 61 as shown in Figs. 1 and 2, the stator of roll synchro 21 must be so adjusted relative to the rotor connected with the gimbal ring of gyro 17 that for zero bank angle of the craft the potential difference across the two leads coupling gyro 17 and amplifier 61 will be zero and for other than a zero bank angle a phase sensitive potential proportional thereto will be generated thereacross. The same zero adjustment will be required in regard to the stator of the pitch synchro 20 relative to the rotor case of gyro 17. Of course, if desired two separate signal generators may be employed on each axis of gyro 17. Thus, one of the bank angle signal generators may supply a control signal for positioning the background member 10 in roll and the other may supply a separate control signal proportional to bank angle to amplifier 61. Likewise, one of the pitch signal generators may supply a control signal for positioning the background member 10 in pitch while the other may supply a separate control signal proportional to pitch angle to amplifier 65.

In the embodiment of the present invention illustrated in Fig. 1, a pitch trim knob 37 is provided for adjusting the zero position of elevation guidance pointer 12 and curtain or shade member 26, and hence, horizon defining line 25, for changes in the loading of the craft, i. e., for changes in the angle of attack of the craft. Pitch trim knob 37 may control a suitable potentiometer, for example, which inserts a bias signal into the pitch servo loop controlling the zero pitch position of member 26 and into the output of summing amplifier and limiter 65 for adjusting the zero vertical position of the elevation guidance pointer 12.

In Figs. 5, 6 and 7 there is illustrated another embodiment of the present invention. This embodiment of the invention differs from the embodiment illustrated in Fig. 1 in that the member providing a movable background for the azimuth and elevation guidance pointers is stabilized directly by means of a vertical gyro mounted within the instrument housing. In this embodiment, the horizon-simulating background for the guidance indicators comprises a spherical member 105 having a horizon-defining line 105' inscribed thereon stabilized by means of a vertical gyro mechanically coupled directly thereto. The vertical gyro comprises a rotor case 106 pivotally supported in roll gimbal 107 for rotation about an axis 107 normally coincident with the pitch axis of the aircraft. Gimbal 107 is in turn pivotally supported for rotation about an axis 109 normally coincident with the roll axis of the aircraft by means of suitable trunnion 110.

As the craft rolls rotor case 106 maintains gimbal 107 horizontal and, therefore, maintains pitch axis 108 and horizon line 105' horizontal in space so that, for example, with the craft in a banked attitude to the right, the horizon line 105' will appear as shown in Fig. 6. Likewise, as the craft pitches, rotor case 106 will rotate spherical member 105 about axis 108 in accordance with the pitch attitude of the craft. However, it is desired that in order to provide proper sensing of pitch attitude by the pilot the spherical member 105 is rotated in a direction opposite to the rotation or rotor case 106 about axis 108. For this purpose an idler gear 111 pivotally mounted on gimbal 107 and meshing with internal gear 112 on member 105 is provided. Thus, as a craft pitches, say upwardly, spherical member 105 and hence horizon defining line 105' will be rotated downwardly. For a more detailed discussion of a vertical gyro of the above type reference may be made to U. S. Patent No. 2,492,992, issued to A. J. Handel on January 3, 1950, and assigned to the same assignee as the present invention.

The azimuth and elevation guidance indicators in the embodiment illustrated in Figs. 5 and 6 comprise arcuate arms 121 and 122 which conform generally to the spherical surface of background member 105 and are pivotally supported in the instrument housing 123 for movement in directions generally parallel to the spherical surface of background member 105. The means for so moving azimuth and elevation guidance indicators 121 and 122 may be a pair of meter movements 124 and 125, respectively, actuated in accordance with the outputs of summing amplifiers and limiters 61 and 65.

The indicating elements illustrated in Fig. 5 are adapted to be mounted in the instrument housing 123 which has in the front wall thereof a viewing opening 126 through which they may be viewed by the pilot (see Fig. 7). A reference index 127 which may be inscribed on the protective glass covering for the opening 126 provides a reference index against which the indicating elements may be referred. The position of the gimbal 107 and hence the position of spherical member 105 is so selected that the spherical member 105 lies adjacent but in slightly spaced relation to the opening 126 such that the guidance pointers 121 and 122 may freely move between the surface of the spherical member 105 and the internal periphery of opening 126. Furthermore, the dimensions or diameter of spherical member 105 is so selected that it extends radially outwardly in all directions beyond the edge of the circular opening 126 thereby providing an unbroken background surface for guidance indicator pointers 121 and 122.

As illustrated in Fig. 6 the course selector 60, shown schematically in Fig. 5, is adjusted by means of a suitable knob 130 by the pilot until the bearing of the selected course appears on a suitable drum-type indicator 131 on the face of the instrument. Also, a drum type counter 132 is controlled in accordance with the compass 16 and indicates to the pilot the magnetic heading of the craft. If desired, a deviation indicator 133 may be provided for indicating to the pilot the magnitude of the displacement of the craft from a selected course such as that defined by a directional radio beam or the magnitude of the angular departure of the craft from a predetermined heading if the pilot is flying a dead-reckoning course without the aid of radio beams.

The operation of the indicator illustrated in Figs. 5 and 6 is identical to that of the indicators illustrated in Fig. 1 except that in Figs. 5 and 6 a remote vertical gyro is not required since the electrical signals proportional to the roll and pitch attitude of the craft required for operating the vertical and horizontal guidance indicators 121, 122 may be generated by means of suitable signal generators 134 and 135 on the roll and pitch axes of the vertical gyro mounted within the instrument case 123.

Although the present invention has been described with reference to its preferred embodiments, it is to be understood that the words that have been used are words of description rather than of limitation and that changes within the purview of the appended claims may be made without departing from the true scope and spirit of the invention in its broader aspects.

What is claimed is:

1. A navigation instrument for aircraft by means of which said aircraft may be controlled to approach and thereafter maintain a desired flight path comprising an instrument housing having a substantially circular viewing opening in the front wall thereof, a reference index located substantially at the center of said opening, azimuth and elevation pointers, means for supporting said pointers in said housing for movement in directions to the right and left and upwardly and downwardly, respectively, across said opening relative to said index, means for controlling said pointers at least in part in accordance with the roll and pitch attitude of said craft such that said pointers are aligned with said reference index not only when the craft is on said path but also when the craft is off said path and its roll and pitch attitude are so adjusted to cause the craft asymptotically to approach said path, a horizon-simulating background member disposed directly behind said pointers and having a normally horizontal line thereon sub-dividing the same into sky and ground areas, and means for stabilizing said background member with respect to the roll and pitch axes of said aircraft, whereby to indicate to the pilot the magnitude and direction of craft control in roll and pitch required to maintain said azimuth and elevation pointers in alignment with said reference index.

2. A navigation instrument for aircraft by means of which said aircraft may be controlled to approach and thereafter maintain a desired flight path comprising an instrument housing having a substantially circular viewing opening in the front wall thereof, a reference index located substantially at the center of said opening, azimuth and elevation pointers, means for supporting said pointers in said housing for movement in directions to the right and left and upwardly and downwardly, respectively, across said opening relative to said index, means for controlling said pointers at least in part in accordance with the roll and pitch attitude of said craft such that said pointers are aligned with said reference index not only when the craft is on said path but also when the craft is off said path and its roll and pitch attitude are so adjusted to cause the craft asymptotically to approach said path, a background for said pointers formed by a member having a horizon-simulating surface disposed directly behind said pointers, means for supporting said background member to rotate substantially about the center of said viewing opening as an axis and to move in directions substantially radially of said opening, said background member being provided with a horizon line sub-dividing the same into sky and ground areas, and means including a vertical gyroscope operatively connected with said member-supporting means for positioning said member in accordance with the roll and pitch attitude of the craft on which said instrument is mounted whereby to indicate to the pilot the magnitude and direction of craft control in roll and pitch required to maintain said azimuth and elevation pointers in alignment with said reference index.

3. A navigation instrument for aircraft by means of which said aircraft may be controlled to approach and thereafter maintain a desired flight path comprising an instrument housing having a substantially circular viewing opening in the front wall thereof, a reference index located substantially at the center of said opening, azimuth and elevation pointers, means for supporting said pointers in said housing for movement in directions to the right and left and upwardly and downwardly, respectively, across said opening relative to said index, means for controlling said pointers at least in part in accordance with the roll and pitch attitude of said craft such that said pointers are aligned with said reference index not only when the craft is on said path but also when the craft is off said path and its roll and pitch attitude are so adjusted to cause the craft asymptotically to approach said path, a background for said pointers formed by a member having a horizon-simulating surface disposed directly behind said pointers adjacent and in slightly spaced relation to said front wall and being of such dimensions as to extend radially outwardly in all directions beyond the edge of the viewing opening therein, means for supporting said background member to rotate substantially about the center of said viewing opening as an axis and to move in directions substantially radially of said opening, said background member being provided with a horizon line sub-dividing the same into upper and lower areas, and means including a vertical gyroscope operatively connected with said member-supporting means for positioning said member in accordance with the roll and pitch attitude of the craft on which said instrument is mounted whereby to indicate to the pilot the magnitude and direction of craft control in roll and pitch required to maintain said azimuth and elevation pointers in alignment with said reference index.

4. A navigation instrument for aircraft comprising an instrument housing having a substantially circular opening in the front wall thereof, a reference index located substantially at the center of said opening, azimuth and elevation pointers, means for supporting said pointers in said housing for movement substantially in a plane adjacent and parallel to said wall and in directions to the right and left and upwardly and downwardly, respectively, across said opening relative to said index and designed to indicate to the pilot to change the bank or pitch attitude of the craft, as the case may be, and thereby cause the craft to fly toward the right or left and up or down, means responsive at least in part to the roll and pitch attitude of said aircraft for so moving said azimuth and elevation pointers, a background for said pointers including a broad, flat, belt of flexible material disposed adjacent and in slightly spaced relation to said front wall in such a manner as to present its broad, flat surface to view the dimensions of said belt being of such dimensions as to extend outwardly in all directions beyond the edge of the viewing opening in said front wall, means including a frame having a pair of spaced, parallel rollers for supporting said belt for movement in translation radially of said opening, means for supporting said frame for rotation about the center of said opening as an axis, a horizon line on said belt sub-dividing the surface thereof into upper and lower areas, and means including a vertical gyroscope operatively connected with said frame and rollers for positioning said belt respectively in accordance with the roll and pitch attitude of the craft on which the instrument is mounted whereby to indicate to the pilot the magnitude and direction of craft control in roll and pitch applied by the pilot in responding to the movement of said azimuth and elevation pointers.

5. A navigation instrument for aircraft comprising an instrument housing having a substantially circular opening in the front wall thereof, a reference index located substantially at the center of said opening, azimuth and elevation pointers, means for supporting said pointers in said housing for movement adjacent said wall in directions to the right and left and upwardly and downwardly, respectively, across said opening relative to said index and designed to indicate to the pilot to change the bank or pitch attitude of the craft, as the case may be, and thereby cause the craft to fly toward the right or left and up or down, means responsive at least in part to the roll and pitch attitude of said aircraft for so moving said azimuth and elevation pointers, a background for said pointers including a substantially spherical member having a viewable surface thereof disposed adjacent and in slightly spaced relation to said front wall, said spherical member being of such dimensions that its surface extends outwardly in all directions beyond the edge of the circular opening in said front wall, means for supporting said spherical member to rotate substantially about the center of said opening as an axis and also to move in directions substantially radially of said opening, a horizon line on said spherical surface sub-dividing the same into upper and lower areas, and means including a vertical gyroscope operatively connected with said member-supporting means for positioning said member in accordance with the roll and pitch attitude of the craft on which said instrument is mounted whereby to indicate to the pilot the magnitude and direction of craft control in roll and pitch applied by the pilot in responding to the movement of said azimuth and elevation pointers.

6. A navigation instrument for aircraft comprising an instrument housing having a substantially circular opening in the front wall thereof, a reference index located substantially at the center of said opening, azimuth and elevation pointers, means for supporting said pointers in said housing for movement adjacent said wall and in directions to the right and left and upwardly and downwardly, respectively, across said opening relative to said index and designed to indicate to the pilot to change the bank or pitch attitude of the craft, as the case may be, and thereby cause the craft to fly toward the right or left and up or down, means responsive at least in part to the roll and pitch attitude of said aircraft for so moving said azimuth and elevation pointers, a vertical gyro including a rotor case, gimbal means for supporting said rotor case in said housing for rotation about first and second axes therewithin parallel respectively to the roll and pitch axes of said aircraft, a substantially spherical member pivotally supported on said roll gimbal for movement therewith about said first axis, means coupling said spherical member with said rotor case to effect opposite relative movement thereof relative to said rotor case about said second axis, said gimbal means being so positioned in said housing that said spherical member provides a movable horizon-simulating background for said pointers being of such diameter that said spherical member extends outwardly in all directions beyond the edge of the viewing opening in said front wall, a horizon line on said spherical surface sub-dividing the same into sky and ground areas whereby to indicate to the pilot the magnitude and direction of craft control in roll and pitch applied by the pilot in responding to the movement of said azimuth and elevation pointers.

7. A navigation instrument for aircraft comprising an instrument housing having a substantially circular opening in the front wall thereof, a reference index located substantially at the center of said opening, azimuth and elevation pointers, means for supporting said pointers in said housing for movement adjacent said wall in directions to the right and left and upwardly and downwardly, respectively, across said opening relative to said index and designed to indicate to the pilot to change the bank or pitch attitude of the craft, as the case may be, and thereby cause the craft to fly toward the right or left and up or down, means responsive at least in part to the roll attitude of said craft for so moving said azimuth pointer, means responsive at least in part to the pitch attitude of said craft for so moving said elevation pointer, a horizon-simulating background member disposed directly behind said pointers and having a normally horizontal line thereon sub-dividing the same into sky and ground areas, and means for stabilizing said background member with respect to the roll and pitch axes of said aircraft, whereby to indicate to the pilot the magnitude and direction of craft control in roll and pitch applied by the pilot in responding to the movement of said azimuth and elevation pointers.

8. A navigation instrument for aircraft comprising an instrument housing having a substantially circular opening in the front wall thereof, a reference index located substantially at the center of said opening, azimuth and elevation pointers, means for supporting said pointers in said housing for movement adjacent said wall and in directions to the right and left and upwardly and downwardly, respectively, across said opening relative to said index and designed to indicate to the pilot to change the bank or pitch attitude of the craft, as the case may be, and thereby cause the craft to fly toward the right or left and up or down, means responsive at least in part to the roll attitude of said craft for so moving said azimuth pointer, means responsive at least in part to the pitch attitude of said craft for so moving said elevation pointer, a background for said pointers formed by a member having a horizon-simulating surface disposed directly behind said pointers, means for supporting said background member to rotate substantially about the center of said viewing opening as an axis and to move in directions substantially radially of said opening, said background member being provided with a horizon line sub-dividing the same into sky and ground areas, and means including a vertical gyroscope operatively connected with said member-supporting means for positioning said member in accordance with the roll and pitch attitude of the craft on which said instrument is mounted whereby to indicate to the pilot the magnitude and direction of craft control in roll and pitch applied by the pilot in responding to the movement of said azimuth and elevation pointers.

9. A navigation system for aircraft including an instrument having an opening in the front wall thereof, a guidance indicator supported in said housing for movement to the right and left across said opening, said indicator normally being symmetrically disposed in said opening, signal responsive means for so moving said indicator whereby to indicate to the pilot to change the bank attitude of the craft and thereby cause the craft to fly toward the right or the left, means for providing a signal proportional to the displacement of said craft from a predetermined radio course, means for providing a signal proportional to the heading of said craft relative to the bearing of said course, means for providing a signal proportional to the bank angle of said craft, means responsive to said signals for supplying an output proportional to the algebraic sum thereof, means for supplying said output signal to said signal responsive means, a background for said guidance indicator formed by a horizon- simulating surface disposed directly behind said indicator, means for supporting said background member to rotate substantially about the center of said viewing opening as an axis, and means responsive to said bank angle signal for positioning said member in accordance with the bank attitude of the craft on which said instrument is mounted, whereby to indicate to the pilot the magnitude and direction of craft control in roll applied by the pilot in responding to the movement of said guidance indicator.

10. A navigation system for aircraft including an instrument having an opening in the front wall thereof, a guidance indicator supported in said housing for movement to the right and left across said opening, said indicator normally being symmetrically disposed in said opening, signal responsive means for so moving said indicator whereby to indicate to the pilot to change the bank attitude of the craft and thereby cause the craft to fly toward the right or the left, means for providing a signal proportional to the displacement of said craft from a predetermined radio course, means for providing a signal proportional to the heading of said craft relative to the bearing of said course, means for providing a signal proportional to the bank angle of said craft, means responsive to said signals for supplying an output proportional to the algebraic sum thereof, means for supplying said output signal to said signal responsive means, a background for said guidance indicator formed by a horizon-simulating surface disposed directly behind said indicator, means for supporting said background member to rotate substantially about the center of said viewing opening as an axis, and means including a vertical gyroscope operatively connected with said member-supporting means for positioning said member in accordance with the roll attitude of the craft on which said instrument is mounted whereby to indicate to the pilot the magnitude and direction of craft control in roll applied by the pilot in responding to the movement of said guidance indicator.

11. A navigation instrument for aircraft comprising an instrument having an opening in the front wall thereof, azimuth and elevation pointers supported in said housing for movement to the right and left and upwardly and downwardly, respectively, across said opening, said pointers normally forming a symmetrical pattern in said opening, signal responsive means connected with said pointers for so moving the same whereby to indicate to the pilot to change the bank or pitch attitude of the craft, as the case may be, and thereby to cause the craft to fly toward the right or left and up or down, means for providing a signal proportional to the displacement of said craft from a predetermined radio beam, means for providing a signal proportional to the heading of said craft relative to the bearing of said beam, means for providing a signal proportional to the bank angle of said craft, means responsive to said signals for supplying an output proportional to the algebraic sum thereof, and means for supplying said output signal to said azimuth pointer signal responsive means, means for providing a signal proportional to the displacement of said craft from a predetermined altitude, means for providing a signal proportional to the pitch angle of said craft, means responsive to said altitude and pitch signals for supplying an output proportional to the algebraic sum thereof, and means for supplying said output signal to said elevation pointer signal responsive means, a horizon-simulating background member disposed directly behind said pointers and having a normally horizontal line thereon sub-dividing the same into sky and ground areas, and means responsive to said bank and pitch signals for positioning said member in accordance with the bank and pitch attitude of said craft whereby to indicate to the pilot the magnitude and direction of craft control in roll and pitch applied by the pilot in responding to the movement of said azimuth and elevation pointers.

(References on following page)

References Cited in the file of this patent

UNITED STATES PATENTS

| | | |
|---|---|---|
| 2,283,190 | Crane | May 19, 1942 |
| 2,424,570 | Jenks | July 29, 1947 |
| 2,467,412 | Wathen | Apr. 19, 1949 |
| 2,636,161 | Hoover | Apr. 21, 1953 |
| 2,677,120 | Konet | Apr. 27, 1954 |
| 2,785,226 | Crane | Aug. 3, 1954 |